April 2, 1968

C. A. POUX 3,376,054

CONDUIT FITTINGS HAVING BAND CLAMPING MEANS

Filed Dec. 7, 1964

INVENTOR
C. A. POUX

BY *Young & Quigg*

ATTORNEYS

United States Patent Office 3,376,054
Patented Apr. 2, 1968

3,376,054
CONDUIT FITTINGS HAVING BAND CLAMPING MEANS
Charles A. Poux, Titusville, Pa., assignor to Phillips Petroleum Company, a corporation of Delaware
Filed Dec. 7, 1964, Ser. No. 416,225
4 Claims. (Cl. 285—174)

ABSTRACT OF THE DISCLOSURE

A method and means for securing fittings to a thermoplastic conduit is provided by forming slots in the fitting wall around its periphery so that a metal band clamp attached over the fitting contacts the conduit wall and provides a frictional purchase necessary to secure the fitting to the conduit.

---

This invention relates to conduit fittings and to a method for securing conduit fittings to a conduit. In one of its aspects it relates to a method and means for fabricating and attaching fittings to a conduit without the necessity for specialized equipment or a skilled technician for the operation. In still another aspect the invention relates to a novel method for securing a fitting to a thermoplastic conduit by frictional contact of the fitting with the conduit.

Thermoplastics are becoming increasingly important as materials of construction for special uses such as conduits for enclosing electrical wires and for pipes for handling corrosive fluids under conditions of relatively low pressure. Thermoplastics are also becoming important for general use as materials of construction and for pipes in general because of the ease of extrusion, molding and machining of such pipes. Pipe joints have been successfully made of thermoplastic materials such as solid polymers of ethylene by means of welding, flange connections and threaded joints. These types of joints, however, have disadvantages in that welding is time consuming and requires the pressence of skilled persons; use of flanges is time consuming, expensive and cumbersome; and threaded fittings are not entirely successful with some thermoplastic materials because of their being subject to notch sensitivity and to cold creep characteristics.

It is therefore a principal object of this invention to provide an improved method and means for joining sections of thermoplastic materials to fittings of various kinds. It is another object to provide an improved method for securing a fitting to a thermoplastic conduit by means of a compressional friction purchase. Other and further objects and advantages of this invention will be apparent to one skilled in the art upon studying this disclosure including the attached drawing and the detailed description of the invention.

Broadly the invention contemplates an improved method and means for securing fittings to a thermoplastic conduit by forming slots in the fitting wall around its periphery and attaching a band clamp over the fitting so that frictional purchase upon the conduit is accomplished by the band clamp upon tightening the band clamp. The coefficient of friction between thermoplastic materials such as polymers of ethylene and steel is quite low, being in the order of 0.06 to 0.2; therefore it is surprising that fittings can be secured to a conduit made of a polymer of ethylene by the frictional pressure of a steel band clamp on the surface of the conduit.

The invention is applicable for securing either metal or thermoplastic fittings to a thermoplastic conduit made of thermoplastics applicable for forming conduits including polyvinyl chloride, polyvinylidene chloride, polytetrafluoroethylene, cellulose acetate, and polymers of ethylene including homopolymers and copolymers of ethylene with higher molecular weight 1-olefin monomers including propylene, 1-butene and the like. Thermoplastic materials particularly preferred in the practice of this invention are polymers and copolymers of ethylene and polymers and copoymers of propylene made in accordance with the process disclosed in U.S. Patent 2,825,721 issued Mar. 4, 1958, to John P. Hogan et al.

Figure 1:
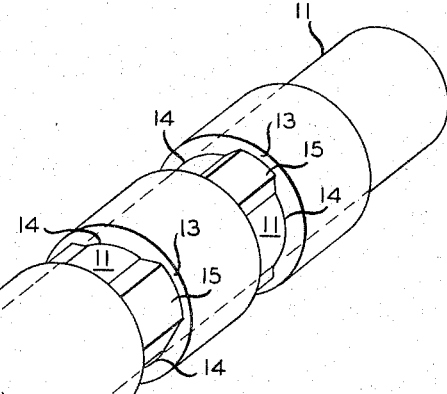
FIGURE 1 illustrates a coupling according to the invention for joining together sections of conduit before the compression bands are applied.
Figure 1:
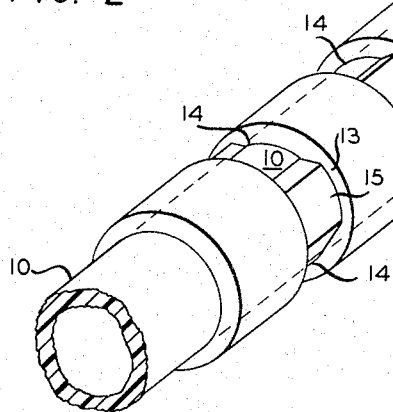

Referring now to FIGURE 1 of the drawing thermoplastic conduit sections 10 and 11 are butted together in coupling 12. A plurality of grooves 13 are formed around the circumferential periphery of the coupling 12 and a plurality of slots 14 are formed through the coupling wall at the locus of each of the grooves so as to leave lands 15. The slots 14 are cut so that a line drawn from the top of one land 15 (bottom of groove 13) to the top of the adjacent land 15 intercepts the surface of the conduit (10 or 11).

Figure 2:
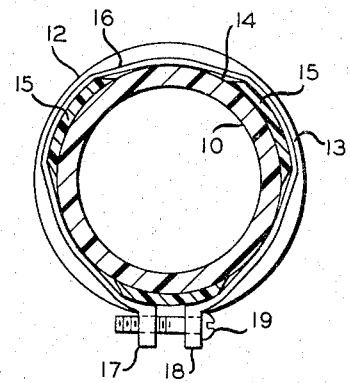
FIGURE 2 is a cross-sectional view of a coupling such as illustrated in FIGURE 1 with the compression band clamp in position.

FIGURE 2 is a cross-sectional view of pipe or conduit 10 and coupling or sleeve 12 with a band clamp 16 positioned in the groove 14. Ear 17 is threaded to receive bolt 19 and ear 18 has unthreaded opening for slidable accommodation of bolt 19. Tightening bolt 19 in threaded ear 17 forces band 16 into compressional contact with the surface of the conduit 10.

A fluid tight coupling for low-pressure service, e.g., 100 p.s.i. or less, can be made by utilizing a resilient O-ring between the ends of the conduit sections where they are butted together in the coupling.

Figure 3:
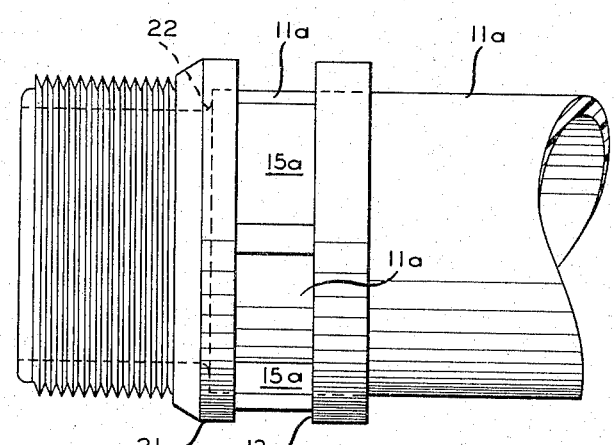
FIGURE 3 illustrates a threaded fitting positioned on a conduit before the compression band clamp is applied.

FIGURE 3 illustrates a fitting 21 secured to a section of conduit 11a according to the invention. The fitting 21 is shown as an externally threaded conduit end member; however, the fitting can be an internally threaded conduit end member, or a T, or an L or any other desired fitting so long as the conduit fits slidably in the fitting with the conduit end butted against a shoulder 22. A fluid tight joint can be made by inserting a resilient O-ring or other suitable gasket between the shoulder 22 and the end of the conduit 11a. Lands 15a are the same as lands 15 of FIGURES 1 and 2. Rubber O-rings or flat rings are suitable as seals for thermoplastic conduits.

I have found the fittings of the invention to be completely satisfactory for joining together sections of pipe made from a solid polymer of ethylene for fabricating long runs (2,000 to 3,000 feet) of pipe. The fittings of the invention are particularly applicable to carrying electrical cable. The externally threaded conduit end member can be screwed directly into an electrical junction box to terminate a run of cable-carrying conduit. The fittings of the invention provide a simple and economical means for splicing cables in the field because no special tools are required for fabricating or using the fittings of the invention. Commercially available stainless steel band clamps were used and the grooves were cut wide enough to accommodate the clamps. The groove is not essential but is desirable as a means for positioning the clamps on the fitting and also provides a greater purchase of the band upon the conduit surface.

The stainless steel band clamps used for the couplings on 2-inch external diameter ethylene polymer pipe were about ½-inch wide, about ¹⁄₃₂-inch thick and the grooves were cut about ⁹⁄₁₆-inch wide and about ¹⁄₁₆-inch deep to accommodate the bands easily. Clamps such as the "Gold Seal" clamp manufactured by the Murray Corporation of Towson, Mo., were found useful for this purpose.

The fittings of the invention provide a strong coupling between adjacent sections of conduit. Two-inch diameter pipe made of a polymer of ethylene and having sections joined together by a coupling according to the invention can be rolled into a coil about 5 feet in diameter for shipment and handling. The strength of the fitting apparently results from friction produced by the compressive grip of the band clamps upon the conduit and the lands of the fitting. In order to achieve this frictional contact the band clamps should be as wide as practical. In any event the width of the band should be greater than its thickness. A plurality of wires or narrow bands can be substituted for a single band so long as they are contiguous in their parallel relationship.

Couplings for joining sections of conduit will normally be made of the same polymer or resin as the conduit. Connectors for joining thermoplastic conduit to metal or other articles will normally be made of the same material as the article connected to the conduit. For example a metal externally threaded fitting will be used to connect a conduit to a metal junction box where electrical cables are carried to or from a junction box.

The number of slots around the periphery of the fitting will be 2 or 3. When 3 slots are equally spaced around the periphery of the fitting the total length of the arcs of the exposed surface of the conduit will be from about 25 to 50 percent of the circumference of the conduit. The thickness of the lands between the slots will not be greater than ½ the external diameter of the conduit. This will sometimes necessitate the formation of a groove in the fitting whether or not a groove was contemplated.

That which is claimed is:

1. A coupling for joining together sections of thermoplastic conduit which comprises a thermoplastic sleeve adapted for a sliding fit over the conduits and having an intermediate annular portion, annular end portions and a plurality of slots formed through the wall of the sleeve between the intermediate portion and the end portions around the circumference of the sleeve leaving lands separating the slots so that the chord of a cricle defined by the outer surface of the lands drawn across the slot will intercept and form a chord through the surface of the conduit section within the sleeve; and a band clamp secured about the sleeve so that the band is in frictional contact with a substantial portion of the circumferential surface of the conduit at said slots.

2. The coupling of claim 1 wherein the band is in frictional contact with about 25 to 50 percent of the circumferential surface of the conduit at the slots.

3. A fitting for joining a thermoplastic conduit to a threaded metal article comprising a threaded metal fitting having an opening therein to accommodate said thermoplastic conduit in sliding relationship and having a shoulder therein for abutting the end of the conduit thereto; a plurality of slots about the circumferential periphery of the fitting between annular end portions leaving lands separating the slots so that a chord of a circle defined by the circumference of the fitting drawn across the slot from the land at one end of the slot to the opposite land will intercept and form a chord through the surface of the conduit positioned in the fitting; and a band clamp secured about the fitting so that the band is in frictional engagement with a substantial portion of the circumferential surface of the conduit at the slots.

4. The fitting of claim 3 wherein the band is in frictional contact with about 25 to 50 percent of the circumferential surface of the conduit at the slots.

References Cited

UNITED STATES PATENTS

| 767,893 | 8/1904 | Jewell | 285—243 |
|---|---|---|---|
| 1,679,709 | 8/1928 | Cooper | 285—238 X |
| 1,891,874 | 12/1932 | Elkins | 287—118 |
| 2,164,605 | 7/1939 | Young | 285—236 X |
| 3,268,654 | 8/1966 | Morrison et al. | 285—236 X |

FOREIGN PATENTS

| 146,408 | 2/1903 | Germany. |
|---|---|---|
| 378,340 | 8/1932 | Great Britain. |

CARL W. TOMLIN, *Primary Examiner.*

THOMAS F. CALLAGHAN, *Assistant Examiner.*